(12) United States Patent  (10) Patent No.: US 8,581,996 B2
Inomata et al.  (45) Date of Patent: Nov. 12, 2013

(54) IMAGING DEVICE

(75) Inventors: Masahiro Inomata, Osaka (JP);
Woobum Kang, Osaka (JP)

(73) Assignee: Keyence Corporation, Osaka (JP)

( * ) Notice: Subject to any disclaimer, the term of this patent is extended or adjusted under 35 U.S.C. 154(b) by 654 days.

(21) Appl. No.: 12/613,594

(22) Filed: Nov. 6, 2009

(65) Prior Publication Data
US 2010/0149363 A1    Jun. 17, 2010

(30) Foreign Application Priority Data

Dec. 12, 2008  (JP) .................................. 2008-317632

(51) Int. Cl.
*H04N 5/228* (2006.01)
*H04N 7/18* (2006.01)
*H04N 5/225* (2006.01)
*H03B 13/00* (2006.01)

(52) U.S. Cl.
USPC ...... 348/222.1; 348/79; 348/345; 348/207.11

(58) Field of Classification Search
USPC .................................. 348/221.1; 382/133, 312
See application file for complete search history.

(56) References Cited

U.S. PATENT DOCUMENTS

| | | | | |
|---|---|---|---|---|
| 6,392,658 | B1 * | 5/2002 | Oura | 345/629 |
| 6,687,419 | B1 | 2/2004 | Atkin | |
| 6,838,667 | B2 * | 1/2005 | Tsuneta et al. | 850/10 |
| 7,206,017 | B1 | 4/2007 | Suzuki | |
| 2004/0131348 | A1 * | 7/2004 | Ohba et al. | 396/432 |
| 2004/0170312 | A1 * | 9/2004 | Soenksen | 382/133 |
| 2005/0002587 | A1 * | 1/2005 | Yoneyama | 382/254 |
| 2005/0163398 | A1 * | 7/2005 | Ioka | 382/284 |
| 2005/0180611 | A1 * | 8/2005 | Oohashi et al. | 382/118 |
| 2006/0045388 | A1 * | 3/2006 | Zeineh et al. | 382/312 |
| 2007/0025723 | A1 * | 2/2007 | Baudisch et al. | 396/287 |
| 2007/0187571 | A1 * | 8/2007 | Ebe et al. | 250/201.2 |

FOREIGN PATENT DOCUMENTS

| | | |
|---|---|---|
| JP | 09-284542 | 10/1997 |
| JP | 11-205675 | 7/1999 |
| JP | 11-264937 | 9/1999 |
| JP | 2000-090232 | 3/2000 |
| JP | 2003-087549 | 3/2003 |
| JP | 2004-343222 | 12/2004 |

OTHER PUBLICATIONS

Office Action issued by the U.S. Patent and Trademark Office in related U.S. Appl. No. 12/613,648 dated Mar. 23, 2012 (16 pages).

* cited by examiner

*Primary Examiner* — Anner Holder
*Assistant Examiner* — On S Mung
(74) *Attorney, Agent, or Firm* — Kilyk & Bowersox, P.L.L.C.

(57) ABSTRACT

This invention provide an imaging device includes: a still image obtaining unit which obtains a plurality of still images; an omnifocal image generation unit which combines the still images, and generates the omnifocal image; a focal position control unit which obtains a focusing position of at least a part of the omnifocal image from height shape data, and controls the focal position so that the focal position of the frame image substantially coincides with the focusing position; a feature quantity extraction unit which extracts feature quantity from the frame image and the omnifocal image or a reference image; a relative position determination unit which determines a relative position between the frame image and the reference image; and a live image display unit which updates a display position of the frame image, and displays a moving picture image on the omnifocal image.

10 Claims, 9 Drawing Sheets

IMAGING DEVICE

CROSS-REFERENCE TO RELATED APPLICATIONS

The present application claims foreign priority based on Japanese Patent Application No. 2008-317632, filed Dec. 12, 2008, the contents of which is incorporated herein by reference.

BACKGROUND OF THE INVENTION

1. Field of the Invention

The present invention relates to imaging devices and, more particularly, relates to an imaging device capable of displaying a moving picture image, which is generated by a camera that photographs an object to be inspected, on a mosaic image that is wider in field of view than an actual field of view of the camera.

2. Description of the Related Art

An image mosaic is known in the related art as a technique which creates a sheet of an image with a wide field of view that is wider in field of view than an actual field of view of a camera by assembling a plurality of still images photographed while changing a field of view. In the case of an imaging device such as an enlarging observation device which photographs a photographic subject enlarged by an objective lens, a field of view can be changed by moving a movable stage on which an object to be inspected is mounted. The image with a wide field of view is called as a mosaic image, and is created by coupling the plurality of still images photographed while changing the field of view in such a manner based on a relative position between images.

For example, in the case of the known imaging device which is equipped with a sensor that detects a position of a movable stage and automatically photographs a photographing range specified by a user, a relative positional relationship between images is judged by control information of the movable stage, and assembly of still images is performed. In such imaging device, when the photographing range is specified and photographing is once started, the photographing range cannot be changed in mid-flow. Furthermore, the position of the movable stage needs to be highly accurately detected; and therefore, there is a problem in that system configuration becomes complicated and high cost.

On the other hand, there is also an imaging device which judges a relative positional relationship between images by pattern matching between the images and assembly of still images is performed. However, there is not an imaging device capable of fetching still images and coupling the same with a mosaic image while making a user confirm a positional relationship between a field of view during photographing and the mosaic image during creation on a display unit. Consequently, there is conceivable an imaging device in which still images are fetched at timing specified by a user and are assembled to a mosaic image while displaying a field of view during photographing as a moving image on the mosaic image.

Furthermore, there is known a technique which photographs a plurality of still images while changing a focal position of a camera, combines these still images, and accordingly creates an omnifocal image and surface shape data. The omnifocal image is deeper in depth of field than an actual field of view of the camera and a composite image that comes into focus in the whole of the field of view. The omnifocal image is created by comparing pixel values between the plurality of the still images different in focal position and by extracting a pixel value of a focal position that comes into focus. On the other hand, the surface shape data is difference in height information showing concavity and convexity or step of the surface of an object to be inspected, and is created by comparing the pixel values between the still images and by determining the focal position that comes into focus.

Generally, in the omnifocal image and the surface shape data, a range that comes into focus, that is, larger concavity and convexity or step than depth of field can be identified. Therefore, the smaller the range that comes into focus is, the higher quality the image data is able to be obtained; however, an actual field of view of a camera becomes narrow. Consequently, if a plurality of the omnifocal images created in such a manner are assembled, the omnifocal image with a wide visual field can be obtained as a mosaic image. However, in order to display a field of view during photographing as a moving picture image at an appropriate position on such a mosaic image, when it is tried to perform positioning of a frame image by pattern matching between images, there is a problem in that the positioning cannot be sometimes performed due to an out-of-focus blur in an overlap portion. As a method of eliminating the out-of-focus blur in the overlap portion, there is conceivable a method which uses a function for changing a focal position of the camera in a predetermined range and searching the focal position that comes into focus, that is, a method which uses an auto focusing function. However, in this method, when a frame image is positioned, the camera needs to be controlled to change the focal position, and the focal position capable of positioning has to be searched by performing pattern matching each time the focal position is changed; and therefore, there is a problem in that a time necessary for positioning becomes long.

BRIEF SUMMARY OF THE INVENTION

The present invention has been made in view of the above circumstances, and an object of the present invention is to provide an imaging device capable of fetching a still image and coupling the same to a mosaic image while making a user recognize a positional relationship between a field of view during photographing and the mosaic image during creation. More particularly, another object of the present invention is to provide an imaging device capable of displaying a field of view during photographing at an appropriate position on a mosaic image made of omnifocal images without complicating a system configuration. In addition, further object of the present invention is to provide an imaging device capable of suppressing an out-of-focus blur from generating in an overlap portion between images and then improving positioning accuracy without increasing a time necessary for positioning a frame image in the case of displaying a field of view during photographing as a moving picture image at an appropriate position on a mosaic image.

An imaging device of a first aspect of the present invention includes: a movable stage capable of moving in two different directions while mounting an object to be inspected; a camera which is arranged in face-to-face relation to the movable stage, photographs the object to be inspected, and generates a moving picture image made of a plurality of continuous frame images; a focal position change unit which changes a focal position of the camera; a still image obtaining unit which controls the camera and the focal position change unit, and obtains not less than two still images different in focal position; an omnifocal image generation unit which combines the not less than two still images, and generates an omnifocal image that is deeper in depth than an actual field of view of the camera; a height shape data generation unit which generates height shape data of the object to be inspected based on a focusing position in each pixel of the omnifocal image; a focal position control unit which obtains the focusing position corresponding to at least a part of the omnifocal image from the height shape data, and controls the focal position change unit so that the focal position of the frame image substantially coincides with the focusing position; a feature quantity extraction unit which extracts feature quantity from the frame image obtained by controlling the focal position change unit, and the omnifocal image or a reference image that is an image extracted based on a plurality of still images constituting the omnifocal image; a relative position determination unit which determines a relative position between the frame image and the reference image by comparing the feature quantity; a live image display unit which updates a display position of the frame image with respect to the omnifocal image based on a determination result of the relative position, and displays the moving picture image on the omnifocal image; and a mosaic image generation unit which obtains a new omnifocal image corresponding to the frame image displayed as the moving picture image by the live image display unit, and generates a mosaic image with coupled to the omnifocal image.

In the imaging device, the relative position between the frame image and the reference image is determined by the comparison of the feature quantity extracted from the frame image and the reference image, and the moving picture image is displayed at an appropriate position on the omnifocal image based on the determination result. According to such a configuration, a field of view during photographing is displayed as the moving picture image at the appropriate position on the omnifocal image; and therefore, it becomes possible to fetch the still image and couple the same to the mosaic image while making a user confirm a positional relationship between the field of view during photographing and the mosaic image during creation. More particularly, the relative positional relationship between the frame image and the reference image is judged by the comparison of the feature quantity extracted from the frame image and the reference image; and therefore, it becomes possible to display the field of view during photographing at the appropriate position on the omnifocal image without complicating a system configuration. Furthermore, at least a part of a focusing position of the omnifocal image is obtained from height shape data and a focal position change unit is controlled to obtain the frame image so that the focal position of the frame image substantially coincides with the focusing position; and therefore, it becomes possible to suppress an out-of-focus blur from generating in an overlap portion between the images without increasing a time necessary for positioning the frame image.

In the imaging device of a second aspect of the present invention, in addition to the above configuration, the relative position determination unit estimates an overlapping area between the frame image and the reference image based on a determination result of a past relative position; and the focal position control unit obtains a focusing position of the overlapping area from the height shape data, and controls the focal position change unit so that the focal position of the frame image substantially coincides with the focusing position. According to such a configuration, the focal position of the camera is previously adjusted so as to substantially coincide with the focusing position of the overlapping area between the frame image and the reference image to obtain the frame image, and positioning with the reference image is performed; and therefore, positioning accuracy can be improved.

In the imaging device of a third aspect of the present invention, in addition to the above configuration, the focal position control unit judges a focal position that seems to be the largest in area of a focusing portion in the overlapping area of the frame image and the reference image as the focusing position in the case of obtaining the focusing position of the overlapping area.

In the imaging device of a fourth aspect of the present invention, in addition to the above configuration, the feature quantity extraction unit extracts feature quantity by setting a still image that is the largest in area of the focusing portion in the overlapping area among the plurality of the still images different in focal position constituting the omnifocal image as the reference image.

The imaging device of a fifth aspect of the present invention, in addition to the above configuration, further includes a reference image candidate obtaining unit which obtains a plurality of reference image candidates different in focal position photographed by the same photographing condition as the frame image, and wherein the feature quantity extraction unit extracts feature quantity by setting a reference image candidate that is the largest in area of the focusing portion in the overlapping area among the reference image candidates as the reference image.

In the imaging device of a sixth aspect of the present invention, in addition to the above configuration, the feature quantity extraction unit extracts feature quantity by setting the omnifocal image as the reference image.

The imaging device of a seventh aspect of the present invention, in addition to the above configuration, further includes, a mosaic shape data generation unit which couples the height shape data and generates mosaic shape data with a range wider than the actual field of view of the camera.

The imaging device of an eighth aspect of the present invention, in addition to the above configuration, further includes, a reference image generation unit which generates the reference image as an image of the focal position that is the largest in area of a focusing portion based on the mosaic image and the mosaic shape data. According to such a configuration, an image of a focal position that is the largest in area of an image area that comes into focus is used as the reference image and positioning of the frame image is performed; and therefore, positioning accuracy of the frame image and the reference image can be improved.

In the imaging device according to claim 8, in addition to the above configuration, the relative position determination unit determines the relative position by comparing feature quantity of the whole of the frame image and feature quantity of the whole of the reference image in the case where the relative position cannot be determined by feature quantity in the overlapping area, and the reference image generation unit generates a new reference image as an image substantially the same in focal position as a final frame image in which the relative position can be determined in the case where the relative position cannot be determined by the comparison of the feature quantity of the whole of the frame image and the feature quantity of the whole of the reference image. According to such configuration, the image substantially the same in focal position as the final frame image in which the relative position can be determined is used as the new reference image and positioning of the frame image is performed; and therefore, positioning accuracy of the frame image and the reference image can be improved.

The imaging device of a tenth aspect of the present invention, in addition to the above configuration, further includes: a positioning reduction section which generates a positioning frame image by reducing the frame image constituting the moving picture image, and generates a positioning reference image by reducing the reference image; and a display reduction unit which generates a display frame image by reducing the frame image constituting the moving picture image, and generates a display mosaic image by reducing the mosaic image, and wherein the feature quantity extraction unit extracts feature quantity from the positioning frame image and the positioning reference image; the relative position determination unit determines a relative position between the positioning frame image and the positioning reference image; the live image display unit displays the moving picture image configured by the display frame image on the display mosaic image as a live image; and the mosaic image generation unit estimates a relative position between the omnifocal image and the mosaic image with higher resolution than the positioning reference image, assembles the omnifocal image to the mosaic image, and generates a new mosaic image.

According to an imaging device of the present invention, a field of view during photographing is displayed as a moving picture image at an appropriate position on an omnifocal image; and therefore, it becomes possible to fetch a still image and to couple the same to a mosaic image while making a user confirm a positional relationship between the field of view during photographing and the mosaic image during creation. More particularly, a relative positional relationship between a frame image and a reference image is judged by the comparison of feature quantity extracted from the frame image and the reference image; and therefore, the field of view during photographing can be displayed at the appropriate position on the omnifocal image without complicating a system configuration. Furthermore, at least a part of a focusing position of the omnifocal image is obtained from height shape data, a focal position change unit is controlled so as to substantially coincide a focal position of the frame image with the focusing position to obtain the frame image; and therefore, it becomes possible to suppress an out-of-focus blur from generating in an overlap portion between the images without increasing a time necessary for positioning the frame image. Therefore, it becomes possible to suppress the out-of-focus blur from generating in the overlap portion between the images and to improve positioning accuracy without increasing the time necessary for positioning the frame image in the case of displaying the field of view during photographing as the moving picture image at the appropriate position on the mosaic image.

DETAILED DESCRIPTION OF THE INVENTION

<Magnification Observation Device>

Figure 1:
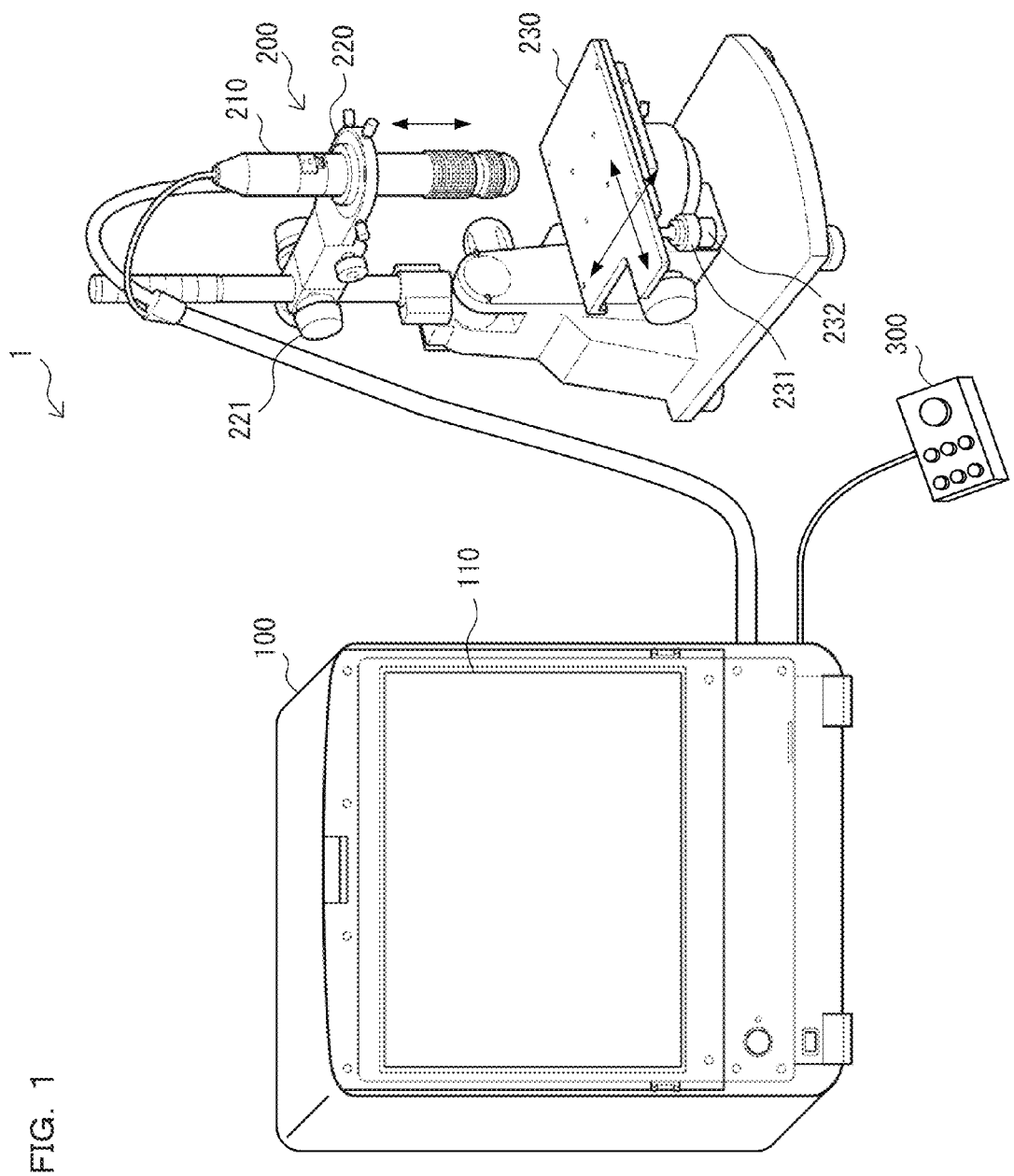
FIG. 1 is a view showing an example of a schematic configuration of an imaging device according to a preferred embodiment of the present invention, and showing a magnification observation device as an example of the imaging device.

FIG. 1 is a system view showing an example of a schematic configuration of an imaging device according to a preferred embodiment of the present invention; and as an example of the imaging device, there is shown a magnification observation device 1 which includes a system body 100, a camera unit 200, and a console 300. The magnification observation device 1 is a digital microscope which generates a moving picture image by photographing a photographic subject enlarged by an objective lens and can display the moving picture image on a display unit 110 of the system body 100.

The camera unit 200 is a photographing unit which is for photographing an object to be inspected while changing a field of view, and includes a camera 210, a movable holder 220, and a movable stage 230. The camera 210 is a read device which photographs the object to be inspected as a photographic subject and generates a moving picture image made of a plurality of frame images that continue at a constant frame rate, and includes a detachable lens unit, a charge coupled device (CCD) image sensor arranged in a cylindrical housing, an illumination device, a focusing mechanism as a unit of changing a focal position of the camera 210, and the like.

The movable holder 220 is a retention unit which movably retains the camera 210 in a direction parallel to a central axis of the objective lens. In this case, the direction parallel to the central axis of the objective lens of the camera 210 is referred to as a z axis direction, and a position of the z axis direction of the camera 210 can be adjusted by turning a positional adjustment knob 221.

The movable stage 230 is a retention unit which retains the object to be inspected, and is movable in the face which is intersected with the z axis in a state where the object to be inspected is mounted. In this case, a plain face perpendicular to the z axis is referred to as an xy plain face, a position in the xy plain face of the movable stage 230 can be adjusted by turning positional adjustment knobs 231 and 232. That is, the movable stage 230 is a stage which can move in two different directions while mounting the object to be inspected by turning the positional adjustment knobs 231 and 232.

More specifically, a position of an x axis direction is adjusted by turning the positional adjustment knob 231, and a position of a Y axis direction can be adjusted by turning the positional adjustment knob 232. The camera 210 is arranged in face-to-face relation to such movable stage 230.

The console 300 is an input device which is for instructing start and completion of photographing, fetch of photographed image data, and the like to the system body 100.

The system body 100 is an image process device which displays the moving picture image photographed by the camera 210 as a live image on the display unit 110, assembles an omnifocal image made of a plurality of still images, and generates a mosaic image that is wider in field of view than an actual field of view of the camera 210.

<System Body>

Figure 2:
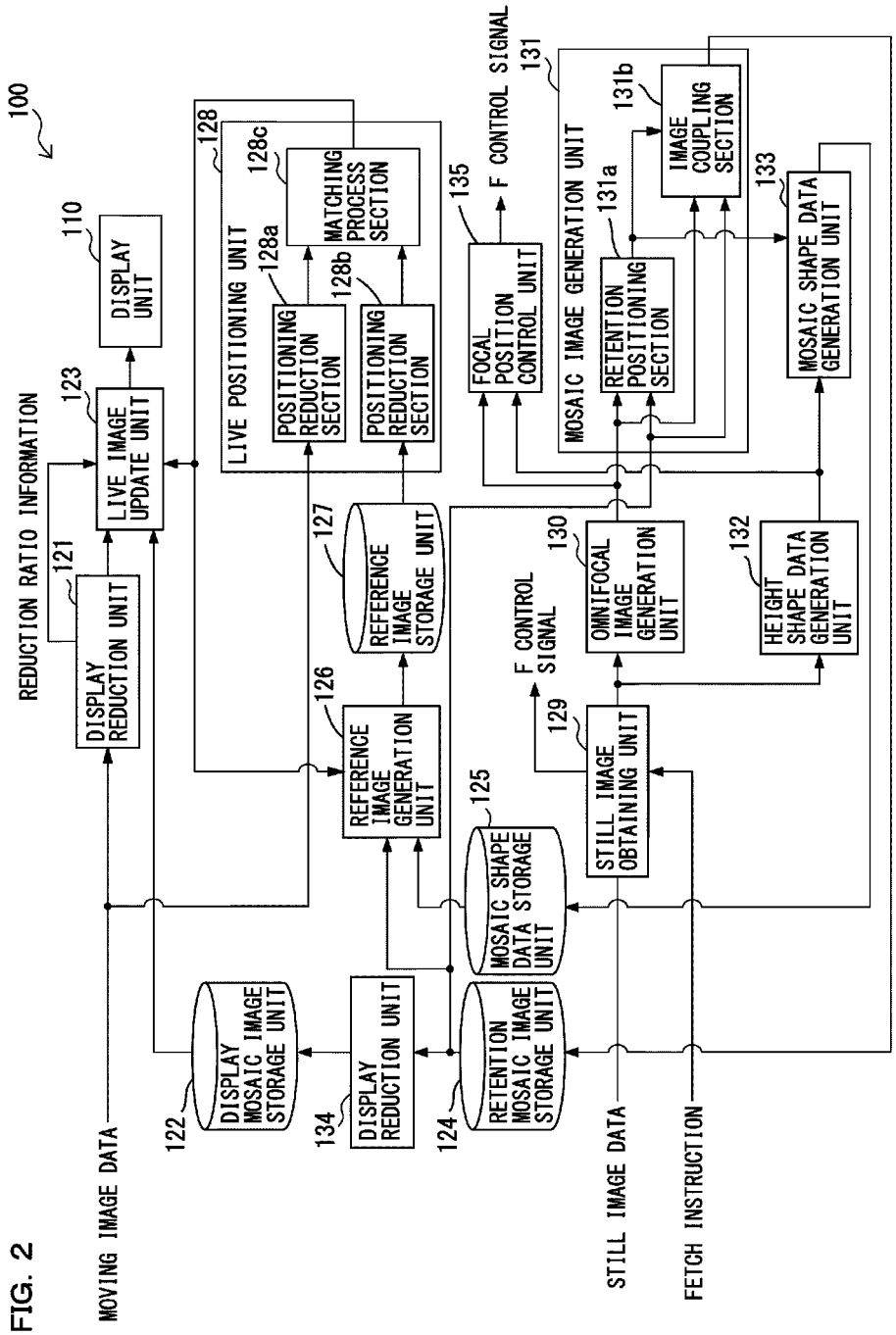
FIG. 2 is a block diagram showing a configuration example in a relevant portion of the magnification observation device shown in FIG. 1, and showing an example of a functional configuration in a system body.

FIG. 2 is a block diagram showing a configuration example in a relevant portion of the magnification observation device 1 shown in FIG. 1, and showing an example of a functional configuration in the system body 100. The system body 100 includes display reduction units 121 and 134, a display mosaic image storage unit 122, a live image update unit 123, a retention mosaic image storage unit 124, a mosaic shape data storage unit 125, a reference image generation unit 126, a reference image storage unit 127, a live positioning unit 128, a still image obtaining unit 129, an omnifocal image generation unit 130, a mosaic image generation unit 131, a height shape data generation unit 132, a mosaic shape data generation unit 133, and a focal position control unit 135, in addition to the display unit 110.

The display reduction unit 121 operates to process moving image data obtained from the camera 210, and to generate reduced moving image data having reduced image size. More specifically, operation is performed that the display reduction unit 121 reduces the frame image continuously obtained from the camera 210 at a predetermined reduction ratio, generates a display frame image, and outputs the same to the live image update unit 123. Reduction of the frame image is performed, for example, by a pixel skipping process and averaging procedure of pixel values. In this case, a reduction process is performed so as not to change an aspect ratio, that is, an aspect ratio of the frame image before and after the reduction.

The display mosaic image storage unit 122 is a mosaic image retention unit which retains a display mosaic image, and is configured by, for example, a volatile semiconductor memory. The live image update unit 123 operates to control the display unit 110 based on reduction ratio information sent from the display reduction unit 121 and to update a display position of the display frame image continuously obtained from the display reduction unit 121 with respect to the display mosaic image, and accordingly to display a live image on the display mosaic image. The live image is a moving picture image which is made of a plurality of continuous display frame images.

The retention mosaic image storage unit 124 is a mosaic image retention unit which retains a retention mosaic image, and is configured by a nonvolatile memory element, for example, a hard disk drive (HDD). The mosaic shape data storage unit 125 is an image data retention unit which retains mosaic shape data, and is made of a nonvolatile memory element, for example, a hard disk drive (HDD).

The reference image generation unit 126 operates to read out the retention mosaic image and the mosaic shape data from the retention mosaic image storage unit 124 and the mosaic shape data storage unit 125, respectively, and to generate a positioning reference image of the frame image based on those image data. The reference image is an image which is for determining a relative positional relationship between the frame image and the mosaic image, and an image of a specific focal position corresponding to a part of the retention mosaic image. The reference image storage unit 127 is a reference image retention unit which retains the reference image generated by the reference image generation unit 126.

The live positioning unit 128 includes positioning reduction sections 128a and 128b, and a matching process section 128c. The live positioning unit 128 operates to reduce the frame images continuously obtained from the camera 210 and the reference image read out from the reference image storage unit 127, respectively and to perform a matching process.

The positioning reduction section 128a operates to reduce the frame image obtained from the camera 210 at a constant reduction ratio for positioning, to generate a positioning frame image, and to output the same to the matching process section 128c. The positioning reduction section 128b operates to reduce the reference image read out from the reference image storage unit 127 at a constant reduction ratio for positioning, to generate a positioning mosaic image, and to output the same to the matching process section 128c.

The matching process section 128c operates to use pattern matching between the positioning frame image and the positioning mosaic image to determine a relative position therebetween, to generate relative position information, and to output the same to the live image update unit 123.

The live image update unit 123 operates to decide a relative position between the display frame image and the display reference image based on relative position information received from the live positioning unit 128, and to update a display position of the display frame image with respect to the display mosaic image of the frame image for display.

The still image obtaining unit 129 operates to control the camera 210 based on a fetch instruction from the console 300, to obtain the plurality of the still images while changing a focal position of the camera 210, and to output the plurality of the still images to the omnifocal image generation unit 130. More specifically, the focusing mechanism of the camera 210 is controlled based on a focusing (F) control signal from the still image obtaining unit 129, and the plurality of the still images different in focal position are obtained as still image data from the camera 210.

The omnifocal image generation unit 130 operates to generate the omnifocal image by combining the plurality of the still images obtained by the still image obtaining unit 129. The omnifocal image is deeper in depth of field than the actual field of view of the camera 210, and a composite image that comes into focus in the whole of the field of view. More specifically, the omnifocal image is generated by comparing pixel values between the plurality of the still images different in focal position, and by extracting a pixel value of a focal position that comes into focus. Incidentally, in the omnifocal image shown in this case, an image including a pixel which does not come into focus by approximately several pixels is also included.

The mosaic image generation unit 131 includes the retention positioning section 131a and an image coupling section 131b, and operates to generate a retention mosaic image by assembling a plurality of the omnifocal image.

The retention positioning section 131a operates to determine a relative position between the omnifocal image generated by omnifocal image generation unit 130 and the retention mosaic image read out from the retention mosaic image storage unit 124. The determination of the relative position is performed by pattern matching between the omnifocal image and the retention mosaic image, and the relative position between the omnifocal image and the retention mosaic image is estimated at higher resolution than that of the positioning reference image.

The image coupling section 131b operates to assemble the omnifocal image and the retention mosaic image based on a determination result by the retention positioning section 131a, to generate a new retention mosaic image, and to update the retention mosaic image in the retention mosaic image storage unit 124. More specifically, the omnifocal image generated by the omnifocal image generation unit 130 and the retention mosaic image read out from the retention mosaic image storage unit 124 are assembled based on the relative position between the images estimated by the retention positioning section 131*a*, so that the new retention mosaic image is generated.

The assembly of the omnifocal image and the retention mosaic image is performed by coupling both images based on the relative position between these images. Furthermore, in the case of coupling the omnifocal image and the retention mosaic image, a blending process of pixel values is performed for an overlapping portion of both images in order to make a join less noticeable.

The blending process is an image process which performs blending of the pixel values between the images, that is, which performs weighted average and obtains the pixel value of the composite image, and weight in the case of performing the weighted average is appropriately changed in response to a pixel position; and accordingly, it makes a join less noticeable. The weight used in the case of performing blending of the pixel values between the images is set so as to be increased in response to distance from the end of the image for the image area of the overlapping portion.

The height shape data generation unit 132 operates to generate height shape data of the object to be inspected based on the plurality of the still images obtained by the still image obtaining unit 129. The height shape data is difference in height information showing concavity and convexity or step of the surface of the object to be inspected, for example, provided by two-dimensional distribution of the height from the reference face. More specifically, the height shape data is generated by comparing the pixel values between the plurality of the still images different in focal position, and by determining the focal position that comes into focus.

The mosaic shape data generation unit 133 operates to generate mosaic shape data with a wider range than the actual field of view of the camera 210 by coupling a plurality of height shape data generated by the height shape data generation unit 132. More specifically, first, a relative positional relationship in the case of coupling the height shape data generated by the height shape data generation unit 132 to the mosaic shape data read out from the mosaic shape data storage unit 125 is judged based on the determination result of the relative position by the retention positioning section 131*a*. Then, operation is performed that the height shape data from the height shape data generation unit 132 and the mosaic shape data are coupled based on the relative positional relationship, new mosaic shape data is generated, and the mosaic shape data in the mosaic shape data storage unit 125 is updated.

The focal position control unit 135 operates to determine a focusing position corresponding to at least a part of the omnifocal image based on the height shape data, and to control the focusing mechanism of the camera 210 so that a focal position of the frame image substantially coincides with the focusing position.

The display reduction unit 134 operates to read out a retention mosaic image after updating from the retention mosaic image storage unit 124 each time the retention mosaic image is updated, to reduce the read out retention mosaic image at a predetermined reduction ratio, and to generate the display mosaic image.

In this case, the live positioning unit 128 is a process unit which performs a matching process with lower accurate than the retention positioning section 131*a*, and outputs low accurate coordinate data as relative position information.

In the reference image generation unit 126, for example, an image area corresponding to the finally assembled omnifocal image is extracted from the retention mosaic image and the positioning reference image is created by the extracted image area and the mosaic shape data corresponding thereto. In this case, operation is performed that the reference image is generated as an image of a focal position that is the largest in area of a single image area including adjacent pixels that comes into focus. That is, the image of the focal position that is the largest in area of the image area that comes into focus serves as the reference image; and accordingly, positioning accuracy of the frame image can be improved.

In addition, in the case where the omnifocal image constituting the mosaic image is a high resolution image with higher resolution in luminance or a high dynamic range (HDR) image with a wider dynamic range in luminance than the frame image, the reference image generation unit 126 performs a process which converts an image data format, for example, a process which converts 16 bit image data to 8 bit image data, in the case of generating the reference image corresponding to a part of the mosaic image.

Incidentally, in the present preferred embodiment, the reference image generation unit 126 generates the reference image, which is an object to be positioned for the frame image, from the stored omnifocal image and the mosaic shape data; however, the reference image may select the still image that is the largest in area of the image area that comes into focus from among the plurality of the still images constituting the omnifocal image; or the omnifocal image itself may be served as the reference image.

Furthermore, in the case where imaging conditions (tone value of luminance and the like) are different in the still image and the frame image which are obtained at a time of photographing the omnifocal image and a matching process to be described later cannot be performed as it is, the plurality of the still images different in the focal position are obtained in the same imaging conditions as the frame image at the time of photographing the omnifocal image to serve as candidate images of the reference image; and from among these candidate images, the still image that is the largest in area of the image area that comes into focus may be selected as the reference image.

<Matching Process Section>

Figure 3:
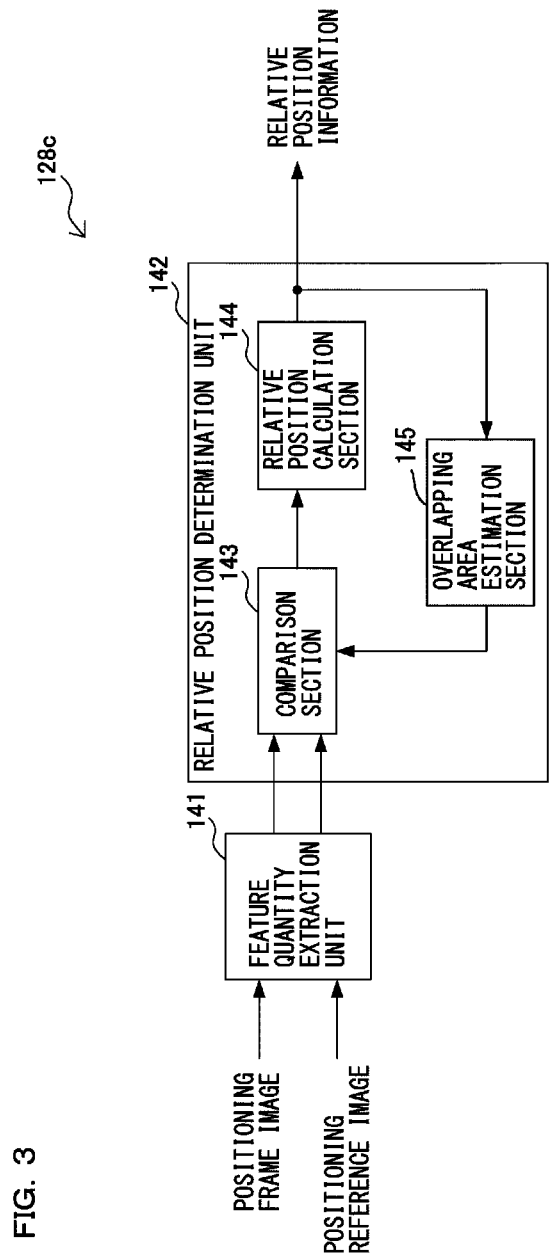
FIG. 3 is a block diagram showing a configuration example of a live positioning unit in a system body shown in FIG. 2, and showing a functional configuration in a matching process section.

FIG. 3 is a block diagram showing a configuration example of the live positioning unit 128 in the system body 100 shown in FIG. 2, and showing an example of a functional configuration in the matching process section 128*c*. The matching process section 128*c* includes a feature quantity extraction unit 141 and a relative position determination unit 142.

The feature quantity extraction unit 141 operates to extract feature quantity from the positioning frame image and the positioning reference image, respectively. As the feature quantity, any feature quantity may be used as long as the feature quantity becomes a marker in the case of comparing images; however, in this case, the top in which a plurality of edges are intersected is extracted as a feature point.

The relative position determination unit 142 includes a comparison section 143, a relative position calculation section 144, and an overlapping area estimation section 145. The relative position determination unit 142 operates to determine a relative position between the positioning frame image and the positioning mosaic image by comparison of the feature points. The comparison section 143 operates to compare a feature point extracted from the positioning frame image with a feature point extracted from the positioning mosaic image, and to output its comparison result to the relative position calculation section 144.

The comparison of the feature points is performed, for example, by extracting an area including a feature point from one pixel as a template and by searching an area most similar to the template area from the other image. As an index which measures the degree of similarity between the areas, there are conceivable a method of using error sum of squares of a luminance value obtained for a pixel in the area and a method of using normalized correlation in which a luminance value of each pixel in the area is normalized by average luminance.

The relative position calculation section 144 operates to determine the relative position between the positioning frame image and the positioning reference image based on the comparison result by the comparison section 143, to output its determination result to the overlapping area estimation section 145, and to output the relative position information to the live image update unit 123.

The overlapping area estimation section 143 operates to estimate an overlapping area of the present positioning frame image and the positioning reference image based on the determination result of the past relative position related to the positioning frame image. For example, operation is performed that an overlapping area of the frame image and the positioning reference image is set from the determination result of a relative position related to a positioning frame image previously provided by one frame, and the overlapping area is judged as the overlapping area of the present frame image and the reference image.

The comparison section 143 operates to compare the feature points in the overlapping area estimated by the overlapping area estimation section 145, and to output a comparison result to the relative position calculation section 144. Then, operation is performed that, in the case where the relative position cannot be determined as a result of comparing, for the feature points in the overlapping area, the whole feature points included in the whole of the positioning frame image and the whole feature points included in the whole of the positioning reference image that is the object of the matching process are compared, and its comparison result is outputted to the relative position calculation section 144.

That is, the relative position calculation section 144 operates to determine the relative position based on the comparison result of the feature points in the overlapping area between the frame image and the reference image which are estimated from the determination result of the past relative position. On the other hand, in the case where the relative position cannot be determined by the comparison of the feature points in such overlapping area, the relative position calculation section 144 operates to determine the relative position based on the comparison result of the feature points of the whole of the positioning frame image and the feature points of the whole of the reference image.

Furthermore, as for positioning frame image at a first frame, operation is performed that the whole feature points included in the whole of the positioning frame image and the whole feature points of the whole of the reference image are compare, and its comparison result is outputted to the relative position calculation section 144. That is, as for the first positioning frame image, the whole feature points of the frame image and the whole feature points of the reference image are compared, and the relative position is determined. On the other hand, as for positioning frame images subsequent to a second frame, first, the feature points in the overlapping area estimated from the determination result of the past relative position related to the frame image are compared, and the relative position is determined. At this time, if the relative position cannot be determined, the whole feature points of the frame image and the whole feature points of the reference image are compared, and the relative position is determined.

In this case, the first frame image is, for example, a first obtained frame image after restarting photographing in the case where photographing is once stopped in the middle of creating the mosaic image and then photographing is restarted.

Generally, in the case where each feature point is extracted from two still images in which each part of the images is overlapped and a group of corresponding feature points is searched between these images, a way of extracting the feature point from the overlapping area of both images and searching the group of corresponding feature point becomes lower in the occurrence probability of false response than that of searching by extracting the feature point from the whole of the images. That is, comparison is preferentially made for the feature point in the overlapping area to determine the relative position; and accordingly, a probability of succeeding in positioning of the positioning frame image can be improved. Further, positioning speed can be improved as compared with the comparison is made for the whole feature points in the screen.

In this case, when the feature quantity extraction unit 141 extracts the feature point from the present positioning frame image, the feature point is extracted from the overlapping area estimated by the overlapping area estimation section 145. Then, in the case where the relative position cannot be determined by only the feature point in the overlapping area, operation of extracting the feature point from an area other than the overlapping area is also performed.

The live image update unit 123 operates to update a display positioning in the case of displaying the moving picture image which is made of the display frame images on the display mosaic image as the live image based on the determination result of the relative position by the relative position calculation section 144, and to output its display data to the display unit 110.

Furthermore, the feature quantity extraction unit 141 determines a focal position that is the largest in area of a single image area including adjacent pixels that comes into focus in the overlapping area based on the mosaic shape data corresponding to the overlapping area, for the overlapping area estimated by the overlapping area estimation section 145, among the positioning reference images. Then, operation is performed that the camera 210 is controlled based on a determination result of the focal position and accordingly the frame image substantially the same in focal position as the reference image is obtained. The focusing mechanism of the camera 210 is controlled based on the F control signal supplied from the feature quantity extraction unit 141.

As described above, in the present preferred embodiment, since the focusing position in the overlapping area of the frame image and the reference image which are estimated by the overlapping area estimation section 145 is determined based on the mosaic shape data, even if the movable stage 230 is moved by a user and the relative position of the reference image that is an object for positioning with the frame image is changed, the focal position of the camera 210 always coincides with the focusing position in the overlapping area. Thus, even when concavity and convexity are present in the object to be imaged and the focusing position is changed, an out-of-focus blur in the overlap area necessary for positioning can be avoided.

In addition, a still image that most comes into focus with a mosaic shape in the estimated overlapping area is automatically selected as the reference image from among not less than two still images different in the focal position, and the frame image may be positioned with respect to the reference image. Thus, it becomes possible to position the reference image that most comes into focus and the frame image that most comes into focus with respect to the mosaic shape in the overlapping area.

Furthermore, in the case where the relative position cannot be determined even by the comparison of the feature quantity of the whole of the frame image and the feature quantity of the whole of the reference image, the reference image generation unit 126 operates to generate a new reference image as an image substantially the same in focal position as a final frame image in which the relative position can be determined. This allows to improve positioning accuracy of the frame image and the reference image because positioning of the frame image is performed by using the image substantially the same in focal position as the final frame image in which the relative position can be determined as the new reference image.

<Live Screen>

Figure 4:
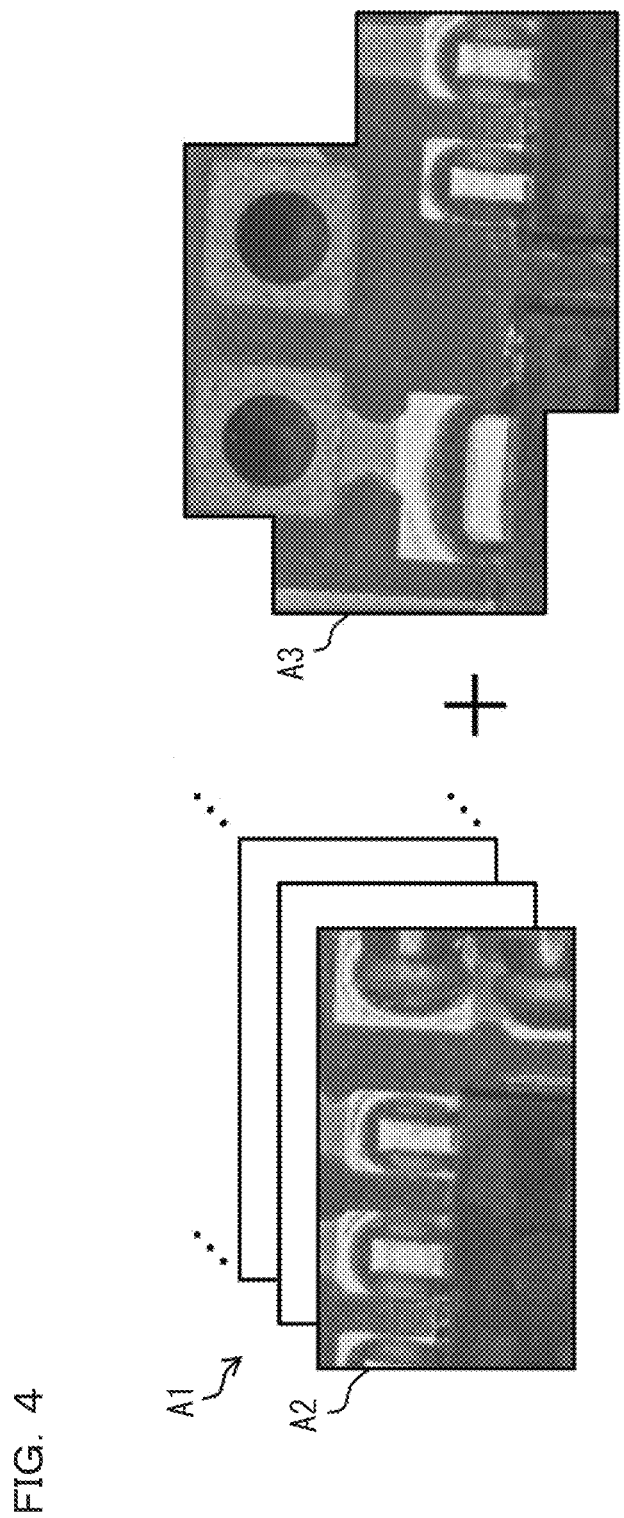
FIG. 4 is an explanation view exemplarily showing an example of operation during displaying a live image in the magnification observation device shown in FIG. 1, and showing a moving picture image A1 and a display mosaic image A3.
Figure 5:
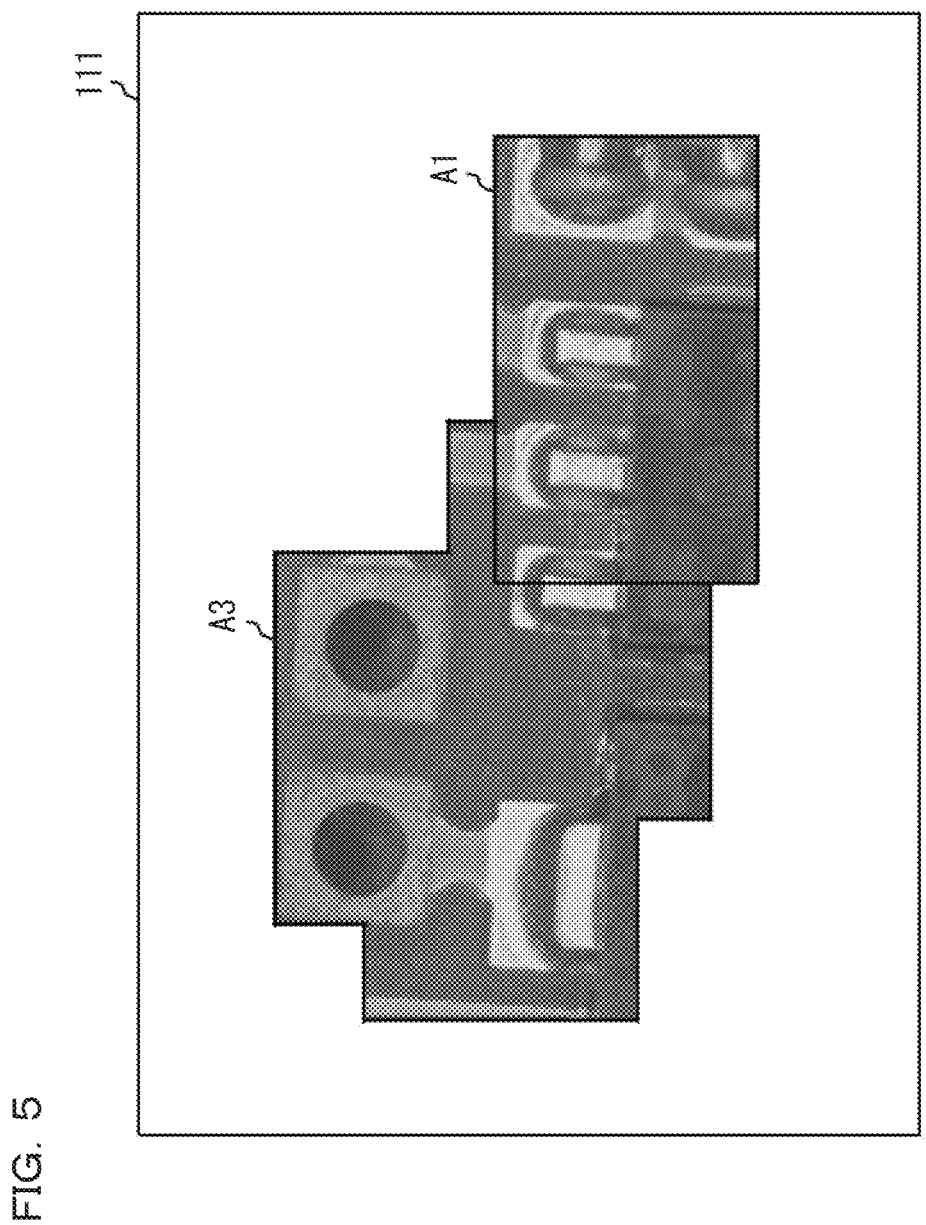
FIG. 5 is an explanation view exemplarily showing an example of operation during displaying a live image of the magnification observation device shown in FIG. 1, and showing a live screen.

FIGS. 4 and 5 are explanation views each exemplarily showing an example of operation during displaying the live image in the magnification observation device 1 shown in FIG. 1. FIG. 4 shows a moving picture image A1 and a display mosaic image A3 photographed by the camera 210. Furthermore, FIG. 5 shows a live screen 111 in which the moving picture image A1 is arranged as the live image on the mosaic image A3.

The moving picture image A1 is made of display frame images A2 which are repeatedly generated at a constant frame rate. For example, the display frame image A2 is generated at 15 frames per second (fps).

The display mosaic image A3 is the mosaic image created by reducing the retention mosaic image for displaying the live screen, and is made of the plurality of omnifocal images.

The live screen 111 is a monitor screen displayed on the display unit 110, and the display mosaic image A3 and the moving picture image A1 during creation are displayed thereon. In the live screen 111, the moving picture image A1 is arranged at a display position which is decided from the relative position determined by pattern matching between the present positioning frame image and the positioning reference image.

That is, the moving picture image A1 during photographing is displayed as the live image at an appropriate position on the display mosaic image A3 during creation; and therefore, a user can fetch still images and couple the same to the retention mosaic image while confirming a positional relationship between a field of view during photographing and the mosaic image during creation.

<Pattern Matching>

Figure 6A:
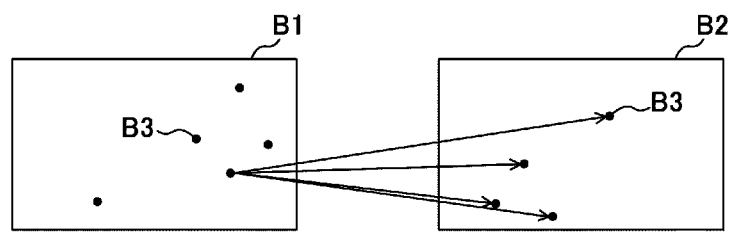
FIGS. 6A and 6B are diagrams each showing an example of operation of pattern matching in the magnification observation device shown in FIG. 1, and showing a state in which right correspondence between feature points is extracted by comparison of the whole feature points B3.
Figure 6B:
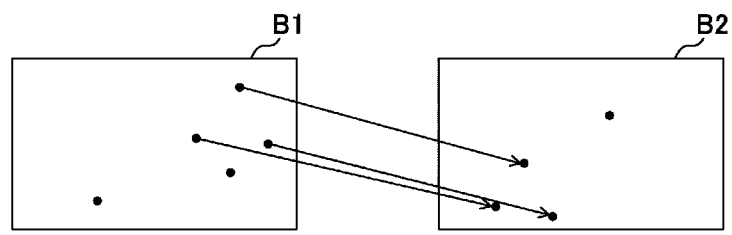

FIGS. 6A and 6B are diagrams each showing an example of operation of pattern matching in the magnification observation device 1 shown in FIG. 1, and there is shown a state in which right correspondence between these feature points is extracted by comparison of the whole feature points B3 each extracted from the reference image B1 and the positioning frame image B2. FIG. 6A shows a state in which the feature point B3 extracted from the reference image B1 is compared with each feature point B3 in the frame image B2; and FIG. 6B shows the right correspondence between the feature points extracted based on the comparison of the feature point B3.

The reference image B1 is an image corresponding to a part of the mosaic image during creation, and is previously extracted from the retention mosaic image as a processing object of the pattern matching. For example, a finally coupled omnifocal image is extracted as the reference image B1. Alternatively, when the size of the overlapping area of the finally coupled omnifocal image with respect to the retention mosaic image and the present frame image is less than a constant level and the relative position between these images cannot be determined, other omnifocal image adjacent to the finally coupled omnifocal image with respect to the retention mosaic image is extracted as the reference image B1.

In the case where a positional relationship between the reference image B1 and the frame image B2 is unclear, the feature point B3 is extracted by setting the whole of the image as an object. Then, a judgment is made by comparison between the feature points as to whether or not a similar feature point is present in the frame image B2 for the respective feature points B3 extracted from the reference image B1.

The degree of similarity between the feature points can be measured by a predetermined area including the feature point B3, for example, error sum of squares or normalized correlation of a luminance value calculated for a rectangular area of 5 pixels by 5 pixels.

The right correspondence between the feature points is extracted based on such a comparison result. For example, correspondence between the feature points moved in parallel in the same direction is extracted as right correspondence. The relative position between the reference image B1 and the frame image B2 is determined by judging the amount of movement in the image of the feature point based on the right correspondence between the extracted feature points and by judging the amount of movement of the frame image B2 with respect to the reference image B1 from the amount of movement.

Figure 7A:
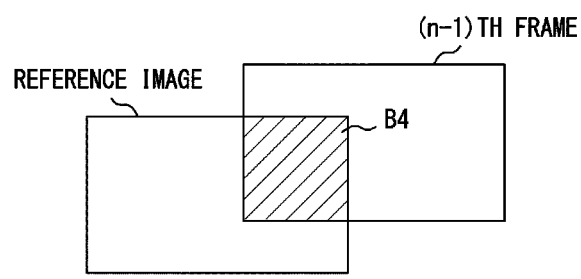
FIGS. 7A and 7B are a diagram showing an example of operation of pattern matching in the magnification observation device shown in FIG. 1, and showing a state where feature points in overlapping areas B5 and B6 are compared.
Figure 7B:
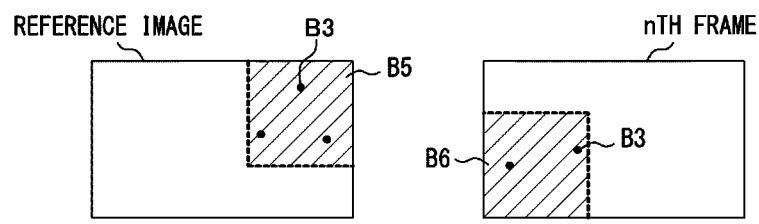

FIGS. 7A and 7B are diagrams each showing an example of operation of pattern matching in the magnification observation device 1 shown in FIG. 1, and showing a state where feature points B3 in overlapping areas B5 and B6 estimated from a relative position between a reference image and an (n−1)th frame image are compared. FIG. 7A shows an overlapping area B4 of both images obtained from the relative position between the reference image and the (n−1)th frame image. Furthermore, FIG. 7B shows overlapping areas B5 and B6 of the reference image and an nth frame image estimated from the relative position between the reference image and the (n−1)th frame image.

In the case where rough positional relationship between the reference image B1 and the frame image B2 is known, a template area is appropriately extracted from one image and the vicinity of an area corresponding to the other image is searched; and accordingly, the relative position between these images can be determined with higher accuracy.

That is, the overlapping area B4 of these images is obtained from a determination result of the relative position between the (n−1)th frame image previously provided by one frame and the reference image. The overlapping area B4 is judged as the overlapping areas B5 and B6 of the present nth frame image and the reference image. Then, for each of the feature points B3 in the overlapping area B5 of the reference image, similar feature points are extracted from the overlapping area B6 of the nth frame image; and accordingly, the relative position between these images is determined.

The extraction of the similar feature points is performed by extracting a predetermined area in the vicinity of a position corresponding to the feature points from the overlapping area B6 of the nth frame image for each of the feature points B3 in the overlapping area B5 of the reference image, and by searching the inside of the area.

In the present preferred embodiment, there is adopted a method shown in FIG. 7 in which the comparison is made for the feature points in the overlapping area with respect to the positioning of a positioning frame image subsequent to a second frame and a positioning reference image. On the other hand, in the case where the relative position cannot be determined by the positioning of the positioning frame image of a first frame and the positioning reference image and by the comparison of the feature points in the overlapping area, or, in the case of positioning the still image fetched based on a fetch instruction and the retention mosaic image, the method shown in FIG. 6 in which the comparison is made for the whole feature points.

Figure 8:
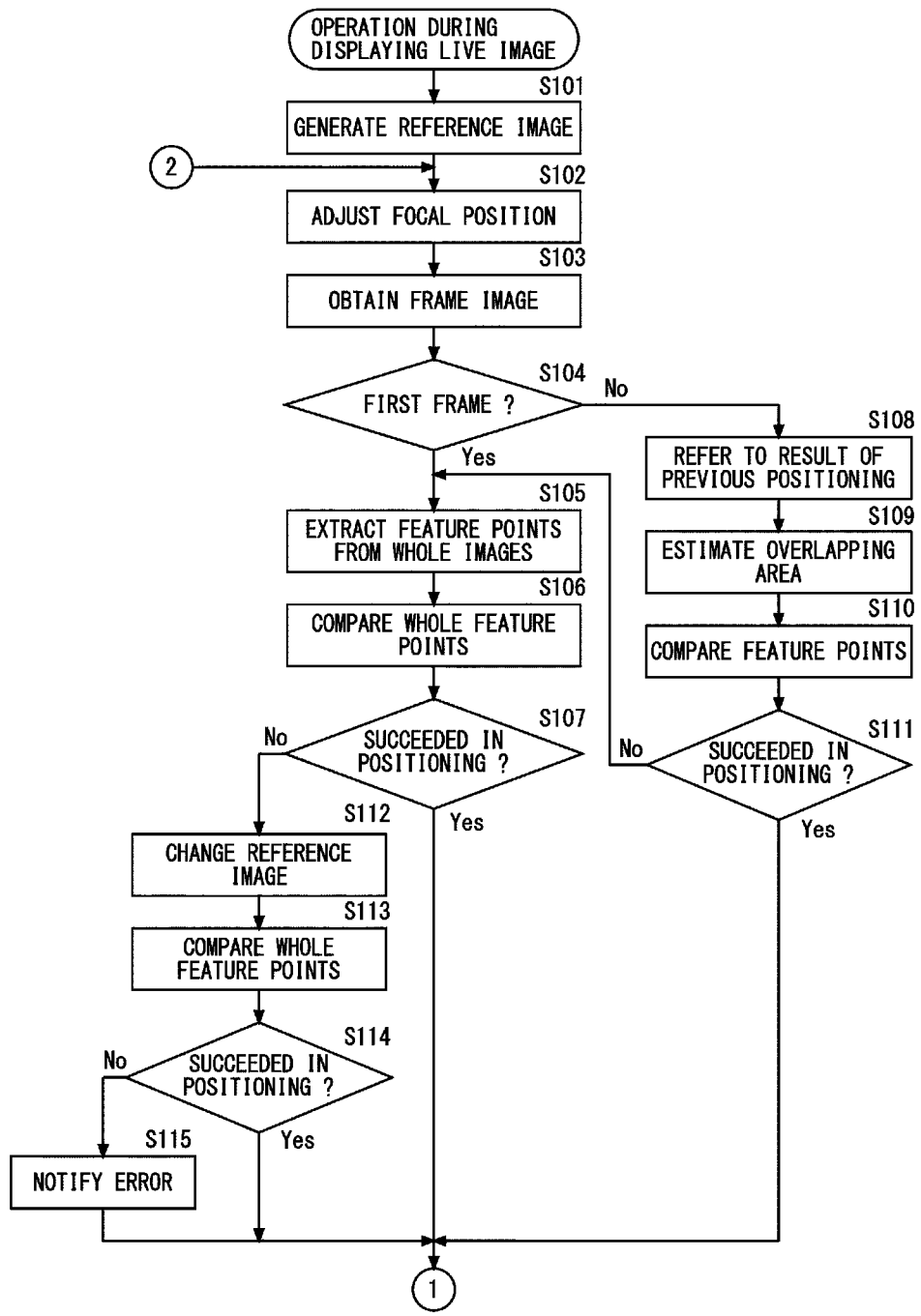
FIG. 8 is a flow chart showing an example of operation during displaying a live image in the magnification observation device shown in FIG. 1.
Figure 9:
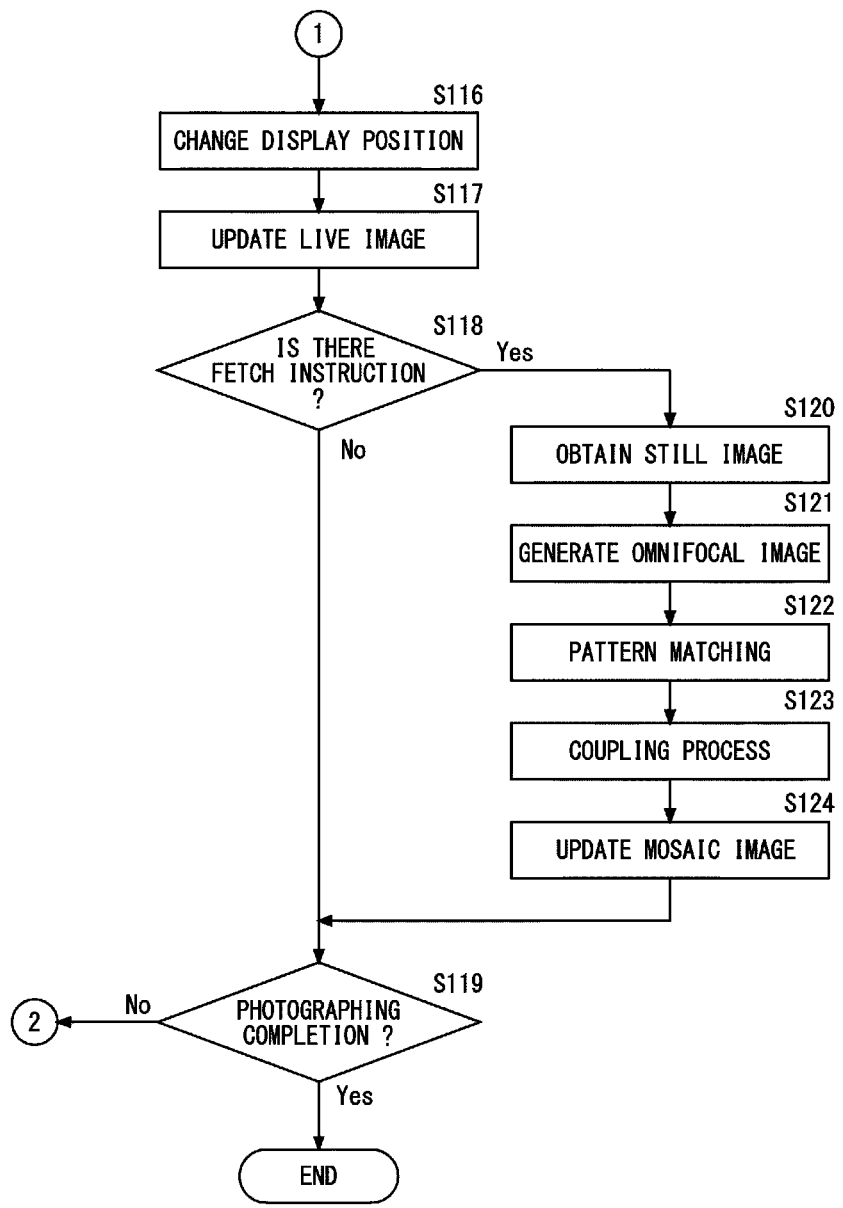
FIG. 9 is a flow chart showing an example of operation during displaying the live image in the magnification observation device shown in FIG. 1.

Steps S101 to S124 shown in FIGS. 8 and 9 are flow charts each showing an example of operation during displaying a live image in the magnification observation device 1 shown in FIG. 1. First, the reference image generation unit 126 extracts an image area corresponding to a finally assembled omnifocal image from a retention mosaic image, and generates a reference image as an image of a focal position that is the largest in area of a single image area including adjacent pixels that comes into focus from the extracted image area and corresponding mosaic shape data (step S101).

Next, the feature quantity extraction unit 141 controls the focusing mechanism of the camera 210, adjusts the focal position, and obtains a positioning frame image substantially the same in focal position as the reference image (steps S102 and S103). Then, if the obtained positioning frame image is a first frame image, feature points are extracted from the whole of the images (steps S104 and S105).

Next, the relative position determination unit 142 compares for the whole feature points of each image, and determines a relative position between the present positioning frame image and a positioning reference image (step S106). At this time, if the relative position cannot be determined, the reference image is changed to a final frame image succeeded in positioning and an image substantially the same in focal position, and the relative position is determined by comparing the whole feature points included in the whole of the changed reference image and the whole feature points of the frame image (steps S107, S112, and S113).

Then, if the relative position can be determined and the frame image succeeds in positioning in step S107, a display position of the frame image with respect to the mosaic image is changed based on a determination result of the relative position, and the live image is updated (steps S114, S116, and S117). When the relative position cannot be determined even by the comparison of the feature points of the whole of the changed reference image and the feature points of the whole of the frame image and when failed in positioning, matching error is notified (steps S114 and S115).

When the relative position can be determined and when succeeded in positioning of the frame image in step S107, the display position of the frame image with respect to the mosaic image is changed based on the determination result of the relative position, and the live image is updated (steps S107, S116, and S117).

On the other hand, if the obtained positioning frame image is not the first frame image, the relative position determination unit 142 refers to a previous positioning result, that is, a determination result of a relative position between a positioning frame image previously provided by one frame and the positioning reference image, and estimates an overlapping area between the present positioning frame image and the positioning reference image (step S104, S108, and S109). The feature quantity extraction unit 141 extracts the feature points from the estimated overlapping area.

Next, the relative position determination unit 142 compares for the feature points in the overlapping area between the present positioning frame image and the positioning reference image, and determines the relative position between these images (step S110). At this time, if the relative position cannot be determined, a process procedure subsequent to step S105 is executed (step S111).

When the relative position can be determined and when succeeded in positioning in step S111, the display position of the frame image with respect to the mosaic image is changed based on the determination result of the relative position, and the live image is updated (steps S111, S116, and S117).

If a fetch instruction of assembling still image is given after updating the live image, the still image obtaining unit 129 obtains a plurality of still images different in focal position based on the fetch instruction (steps S118 and S120). The omnifocal image generation unit 130 combines these still images and generates the omnifocal image (step S121).

The mosaic image generation unit 131 estimates the relative position between these images by pattern matching between the omnifocal image and the retention mosaic image, performs a process to couple both images based on its estimation result, and updates the retention mosaic image (steps S122 to S124).

The process procedure from step S102 to step S118 is repeated until photographing completion is instructed (step S119).

According to the present preferred embodiment, a field of view during photographing is displayed as a live image at an appropriate position on a mosaic image during creation; and therefore, it becomes possible to fetch a still image and couple the same to a mosaic image while making a user confirm a positional relationship between the field of view during photographing and the mosaic image during creation. More particularly, a relative positional relationship between a frame image and the mosaic image is judged by the comparison of feature quantity extracted from the frame image and a reference image; and therefore, the field of view during photographing can be displayed at an appropriate position on the mosaic image made of omnifocal images without complicating a system configuration. Furthermore, a frame image substantially the same in focal position as a positioning reference image is obtained and positioning of the frame image is performed; and therefore, it becomes possible to suppress an out-of-focus blur from generating in an overlap portion between images without increasing a time necessary for positioning as compared with a method using an auto focusing function.

Besides, in the case of comparing the feature quantity, an overlapping area between the frame image and the reference image is estimated based on a determination result of a past relative position and the feature quantity in the overlapping area is compared; and therefore, positioning accuracy of the frame image and the reference image can be improved.

In addition, in the present preferred embodiment, the description is made about the example where a plurality of still images different in focal position are obtained by controlling the focusing mechanism of the camera 210; however, the present invention is not limited to this. For example, in the present invention, there is also included one in which the movable stage 230 can be moved in a z axis direction; a position sensor which detects a position of the movable stage 230 in the z axis direction is equipped; and the still image different in focal position is obtained while moving the movable stage 230 in the z axis direction.

Furthermore, in the present preferred embodiment, the description is made about the example where a top in which a plurality of edges are intersected as feature quantity in the case of comparing a positioning frame image and a positioning reference image; however, the present invention is not limited to this. For example, for a predetermined area on an image, a contrast value in the area serving as the feature quantity is extracted from the positioning frame image and the positioning reference image, respectively; and a comparison may be made between these images. Furthermore, for the predetermined area in an overlapping area, template matching may be executed based on the feature quantity in the area without extracting an edge and a contrast.

What is claimed is:

1. An imaging device comprising:
    a movable stage capable of moving in two different directions while mounting an object to be inspected;
    a camera which is arranged in face-to-face relation to the movable stage, photographs the object to be inspected, and generates a moving picture image made of a plurality of continuous frame images;
    a focal position change unit which changes a focal position of the camera;
    a still image obtaining unit which controls the camera and the focal position change unit, and obtains not less than two still images different in focal position;
    an omnifocal image generation unit which combines the still images, and generates an omnifocal image that is deeper in depth than an actual field of view of the camera;
    a height shape data generation unit which generates height shape data of the object to be inspected based on a focusing position in each pixel of the omnifocal image;
    a focal position control unit which obtains the focusing position corresponding to at least a part of the omnifocal image from the height shape data, and controls the focal position change unit so that the focal position of the frame image, photographed in different X-Y position from the omnifocal image, substantially coincides with the focusing position;
    a live positioning unit which includes a feature quantity extraction unit and a relative position determination unit, wherein the feature quantity extraction unit which extracts feature quantity from the frame image obtained by controlling the focal position change unit, and the omnifocal image or a reference image that is an image extracted based on a plurality of still images constituting the omnifocal image and the relative position determination unit which determines a relative position in X-Y direction between the frame image and the reference image by comparing the feature quantity;
    a live image display unit which updates a display position of the frame image with respect to the omnifocal image based on a determination result of the relative position, and displays the moving picture image on the omnifocal image; and
    a mosaic image generation unit which obtains a new omnifocal image corresponding to the frame image displayed as the moving picture image by the live image display unit, and generates a mosaic image with coupled to the omnifocal image, wherein
    the mosaic image generation unit includes a retention positioning section which operates to determine a relative position between the new omnifocal image and the mosaic image by performing a matching process with higher accuracy than the live positioning unit and an image coupling section which operates to assemble the omnifocal image and the mosaic image based on a determination result by the retention positioning section to generate a new mosaic image.

2. The imaging device according to claim 1, wherein
    the relative position determination unit estimates an overlapping area between the frame image and the reference image based on a past determination result of a relative position; and
    the focal position control unit obtains a focusing position of the overlapping area from the height shape data, and controls the focal position change unit so that the focal position of the frame image substantially coincides with the focusing position.

3. The imaging device according to claim 2, wherein
    the focal position control unit judges a focal position that is the largest in area of a focusing portion in the overlapping area of the frame image and the reference image as the focusing position in the case of obtaining the focusing position of the overlapping area.

4. The imaging device according to claim 2, wherein
    the feature quantity extraction unit extracts feature quantity by setting a still image that is the largest in area of the focusing portion in the overlapping area among the plurality of the still images different in focal position constituting the omnifocal image as the reference image.

5. The imaging device according to claim 2, further comprising,
    a reference image candidate obtaining unit which obtains a plurality of reference image candidates different in focal position photographed by the same photographing condition as the frame image, and wherein
    the feature quantity extraction unit extracts feature quantity by setting a reference image candidate that is the largest in area of the focusing portion in the overlapping area among the reference image candidates as the reference image.

6. The imaging device according to claim 1, wherein
    the feature quantity extraction unit extracts feature quantity by setting the omnifocal image as the reference image.

7. The imaging device according to claim 1, further comprising,
    a mosaic shape data generation unit which couples the height shape data and generates mosaic shape data with a range wider than the actual field of view of the camera.

8. The imaging device according to claim 7, further comprising,
    a reference image generation unit which generates the reference image as an image of the focal position that is the largest in area of a focusing portion based on the mosaic image and the mosaic shape data.

9. The imaging device according to claim 8, wherein
    the relative position determination unit determines the relative position by comparing feature quantity of the whole of the frame image and feature quantity of the whole of the reference image in the case where the relative position cannot be determined by feature quantity in the overlapping area, and
    the reference image generation unit generates a new reference image as an image substantially the same in focal position as a final frame image in which the relative position can be determined in the case where the relative position cannot be determined by the comparison of the feature quantity of the whole of the frame image and the feature quantity of the whole of the reference image.

10. The imaging device according to claim 1, further comprising:
    a positioning reduction section which generates a positioning frame image by reducing the frame image constituting the moving picture image, and generates a positioning reference image by reducing the reference image; and a display reduction unit which generates a display frame image by reducing the frame image constituting the moving picture image, and generates a display mosaic image by reducing the mosaic image, and wherein the feature quantity extraction unit extracts feature quantity from the positioning frame image and the positioning reference image;

the relative position determination unit determines a relative position between the positioning frame image and the positioning reference image;

the live image display unit displays the moving picture image configured by the display frame image on the display mosaic image as a live image; and the mosaic image generation unit estimates a relative position between the omnifocal image and the mosaic image with higher resolution than the positioning reference image, assembles the omnifocal image to the mosaic image, and generates a new mosaic image.

* * * * *